(12) United States Patent
Noel et al.

(10) Patent No.: US 11,808,636 B2
(45) Date of Patent: Nov. 7, 2023

(54) TEMPERATURE SENSOR ASSEMBLY

(71) Applicant: ONESUBSEA IP UK LIMITED, London (GB)

(72) Inventors: Jean Francois Noel, Sandsli (NO); Alexandre Lupeau, Sandsli (NO); Ted Ørjan Seim Gundersen, Sandsli (NO); Emmanuel Lagrand, Sandsli (NO); Stig Kaare Kanstad, Sandsli (NO)

(73) Assignee: ONESUBSEA IP UK LIMITED, London (GB)

( * ) Notice: Subject to any disclaimer, the term of this patent is extended or adjusted under 35 U.S.C. 154(b) by 234 days.

(21) Appl. No.: 17/609,595

(22) PCT Filed: May 8, 2020

(86) PCT No.: PCT/EP2020/062892
§ 371 (c)(1),
(2) Date: Nov. 8, 2021

(87) PCT Pub. No.: WO2020/225424
PCT Pub. Date: Nov. 12, 2020

(65) Prior Publication Data
US 2022/0228927 A1 Jul. 21, 2022

Related U.S. Application Data

(60) Provisional application No. 62/845,622, filed on May 9, 2019.

(51) Int. Cl.
*G01K 1/16* (2006.01)
*G01K 1/08* (2021.01)
(Continued)

(52) U.S. Cl.
CPC ............... *G01K 1/16* (2013.01); *G01K 1/08* (2013.01); *G01K 1/143* (2013.01); *G01K 13/02* (2013.01); *E21B 47/07* (2020.05)

(58) Field of Classification Search
CPC ............ G01K 1/16; G01K 1/08; G01K 1/143; G01K 13/02; E21B 47/07
See application file for complete search history.

(56) References Cited

U.S. PATENT DOCUMENTS 5,022,766 A * 6/1991 Phipps ................ G01K 1/14
374/163
5,667,306 A * 9/1997 Montreuil ............ G01K 13/02
374/208

(Continued)

FOREIGN PATENT DOCUMENTS

JP S53143688 11/1978
JP H06160124 6/1994

OTHER PUBLICATIONS

Search Report and Written Opinion of International Patent Application No. PCT/EP2020/062892 dated Aug. 3, 2020; 30 pages.

(Continued)

*Primary Examiner* — Nathaniel T Woodward
*Assistant Examiner* — Philip L Cotey
(74) *Attorney, Agent, or Firm* — Jeffrey D. Frantz

(57) ABSTRACT

A temperature sensor assembly for measuring temperature of a fluid in a conduit, the assembly comprising a temperature sensor and a thermowell housing the temperature sensor and embedded in a wall defining the conduit. The thermowell has a face for interfacing the fluid that is substantially non-intrusive relative the conduit and a groove that extends radially inward of the thermowell housing to minimize the cross-sectional area of the thermowell body proximate the location of the temperature sensor.

5 Claims, 4 Drawing Sheets

(51) Int. Cl.
*G01K 13/02* (2021.01)
*G01K 1/143* (2021.01)
 E21B 47/07 (2012.01)

(56) References Cited

U.S. PATENT DOCUMENTS

| | | | | |
|---|---|---|---|---|
| 5,857,775 | A * | 1/1999 | Vodzak | G01J 5/049 |
| | | | | 374/E13.003 |
| 6,354,734 | B1 * | 3/2002 | Curran | E21B 47/06 |
| | | | | 374/138 |
| 2008/0166099 | A1 * | 7/2008 | Dunphy | G02B 6/4428 |
| | | | | 374/E11.015 |
| 2015/0090495 | A1 * | 4/2015 | McGinnis | E21B 47/07 |
| | | | | 175/40 |
| 2018/0313204 | A1 * | 11/2018 | McGinnis | E21B 47/01 |

OTHER PUBLICATIONS

International Preliminary Report on Patentability of International Patent Application No. PCT/EP2020/062892 dated Nov. 18, 2021.

* cited by examiner

TEMPERATURE SENSOR ASSEMBLY

CROSS-REFERENCE TO RELATED APPLICATIONS

This application claims priority to U.S. Provisional Application having Ser. No. 62/845,622, which was filed in May 9, 2019 and is incorporated herein by reference in its entirety.

BACKGROUND

The present disclosure is related in general to monitoring of well conditions such as temperature of flowing well fluids. Monitoring temperature in this manner may be beneficial in maintaining and managing production from the well. For example, when producing hydrocarbon wells, the emergence of undesirable water production is often initially detected by changing temperature of flowing well fluids.

Unfortunately, monitoring fluid temperature of well fluids may be more complicated than merely placing a sensor in a conduit carrying the fluid. For example, there is generally a desire to avoid placing a sensor intrusively in the fluid flow which might obstruct the flow or lead to undesired perturbation, such as induced vibrations or system fatigue. Additionally, in circumstances where the fluid is gaseous or multiphase, the detection itself may be challenging to attain in an accurate manner, particularly where the sensor is only indirectly in contact with the fluid flow.

Efforts to address these issues have been made which involve placing the sensor at an embedded location of the pipe supporting the conduit for fluid flow. This may include the use of a thermowell housing for the sensor. Unfortunately, this leads to poor accuracy. That is, fluctuation of the temperature of the flowing fluid may not readily be picked up on by the sensor which is in closer association with the pipe which is not as responsive in fluctuating temperature. Further, for example but not limited to, in circumstances wherein the pipe is not insulated, the temperature gradient of the pipe is unlikely to match that of the flowing fluid within the pipe due to other influences such as the temperature of the environment outside of the pipe. Thus, even when the temperature is steady and not fluctuating, it is likely that the pipe temperature will not consistently match the temperature of the flowing fluid therein.

SUMMARY

The present disclosure provides various embodiments of assemblies and/or methods of utilizing a temperature apparatus of unique architecture. While the embodiments may be particularly beneficial for use in monitoring hydrocarbon gas production—due to the relatively low density and thermal conductivity—every business segment which requires subsea or topside temperature measurement of fluid flow via non-intrusive means may benefit from the embodiments described herein.

Embodiments detailed herein may be beneficial to applications where the fluid properties being measured are highly sensitive to temperature such as those directed at measuring salinity, fluid conductivity, viscosity and permittivity. That is, the more accurate the fluid temperature measurement is, the more accurate these types of applications are given the reliance on temperature. More specifically, such applications yield maximum accuracy where the associated fluid temperature measurement is of an accuracy of about +/−0.5° C. However, at present, current non-intrusive solutions to measure temperature have an accuracy between +/−5° C. and +/−40° C. in the worst cases. Embodiments herein, however, may reach the target of +/−0.5° C. under favorable conditions.

The embodiments discussed herein are directed at a non-intrusive configuration that allows temperature measurements of flowing fluids with much higher accuracy and shorter time response than other known non-intrusive temperature measurement solutions. In embodiments, the geometry is such that it allows the temperature element inside a thermowell body to remain substantially flush with the inner diameter of the pipe carrying a flowing fluids. In embodiments, the thermowell body might possess a groove at the back of its flush face and openings at the front to allow the flowing fluids to circulate around the location of the temperature measurement. By doing so, the temperature sensing element might be mostly surrounded by the fluids from which the temperature needs to be measured. The configuration of the disclosure can be used with any kind of temperature sensing technology (pt100, thermocouple, optical and others), is robust and cost effective.

A temperature sensor assembly for measuring temperature of a fluid in a conduit, the assembly comprising a temperature sensor; and a thermowell housing the temperature sensor and embedded in a wall defining the conduit, the thermowell having a face for interfacing the fluid that is substantially non-intrusive relative the conduit, and a groove that extends radially inward of the thermowell housing to minimize the cross-sectional area of the thermowell body proximate the location of the temperature sensor.

In embodiments of the disclosure, the face is outfitted with at least two openings to circulate fluid from the conduit toward the location of the temperature sensor.

In embodiments of the disclosure, the second opening is larger than the first opening to promote a differential pressure for the circulation.

In embodiments of the disclosure, the face comprises at least one side in physical communication with the wall, the face being rounded to minimize heat transfer there between.

BRIEF DESCRIPTION OF THE DRAWINGS

For a detailed description of exemplary embodiments, reference will now be made to the accompanying drawings in which.

DETAILED DESCRIPTION

Figure 1:
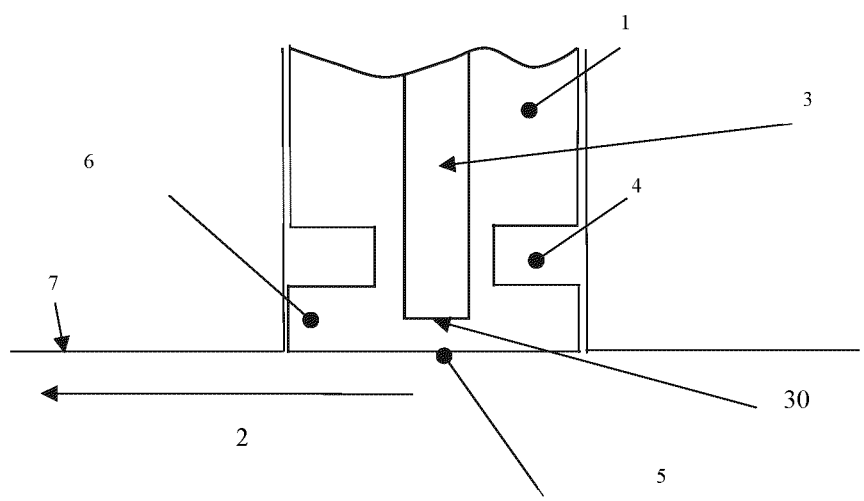
FIG. 1 represents a nonintrusive temperature assembly according to embodiments of the disclosure.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

With the foregoing in mind, with specific reference to the illustration of FIG. 1, a non-intrusive temperature assembly according to embodiments of the disclosure is described to enable acquiring accurate and fast temperature measurement by maximizing the heat transfer from a fluid (gas or liquid, single or multiphase) flowing inside a pipe while minimizing the heat transfer to the remainder of the thermowell body 1. For example, in embodiments of the disclosure, a thermowell body 1 hosts a sensing element 3 that might be at least in part surrounded by the fluid 2 to reinforce accuracy while in the meantime having as little thermal mass as possible to enhance quick time response. To achieve this with a non-intrusive device, the assembly of the disclosure provides appropriate design as further described below. In embodiments, the location of temperature measurement 30 of the sensing element 3 might be placed as close as possible to the front face 5 of the thermowell body 1, which is flush with the inner diameter of a pipe 7 wherein fluid flows. Additionally, a groove 4 might be provided at the back of the front face 5. The groove 4 extends radially inward of the thermowell body 1 and has been designed to minimize the cross-sectional area of the thermowell body 1 proximate the location of the temperature measurement 30 of the sensing element 3. The groove 4 might be positioned such that the location of the temperature measurement 30 is inside a front-end disk 6 of the thermowell body 1. This geometry enables to minimize the heat transfer between the measurement location 30 and the rest of the sensor body 1.

Figure 2:
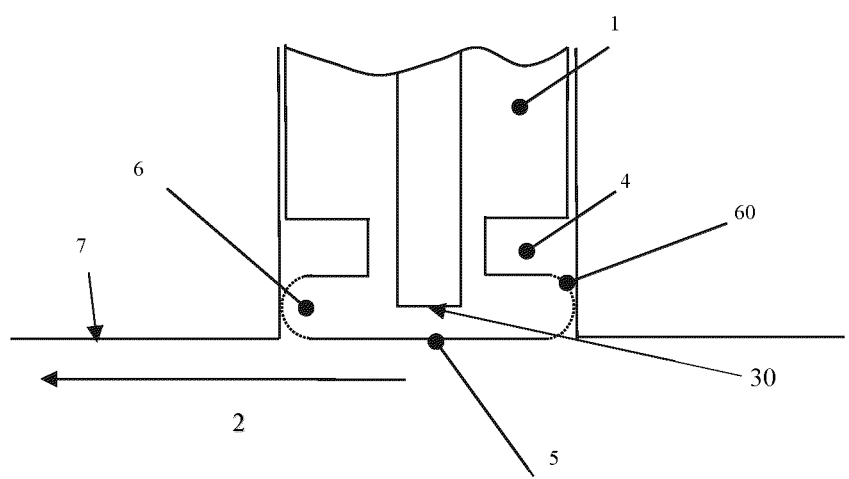
FIG. 2 represents a nonintrusive temperature assembly according to further embodiments of the disclosure.

With specific reference to FIG. 2, in embodiments of the assembly of the disclosure, the front face 5 might be kept large to provide as much heat transfer as possible to the location 30 of measurement. However, the edge 60 of the front face disk 6 might be curved or truncated to minimize the contact area with the pipe. This minimizes the heat transfer between the thermowell disk and the pipe 7.

Figure 3:
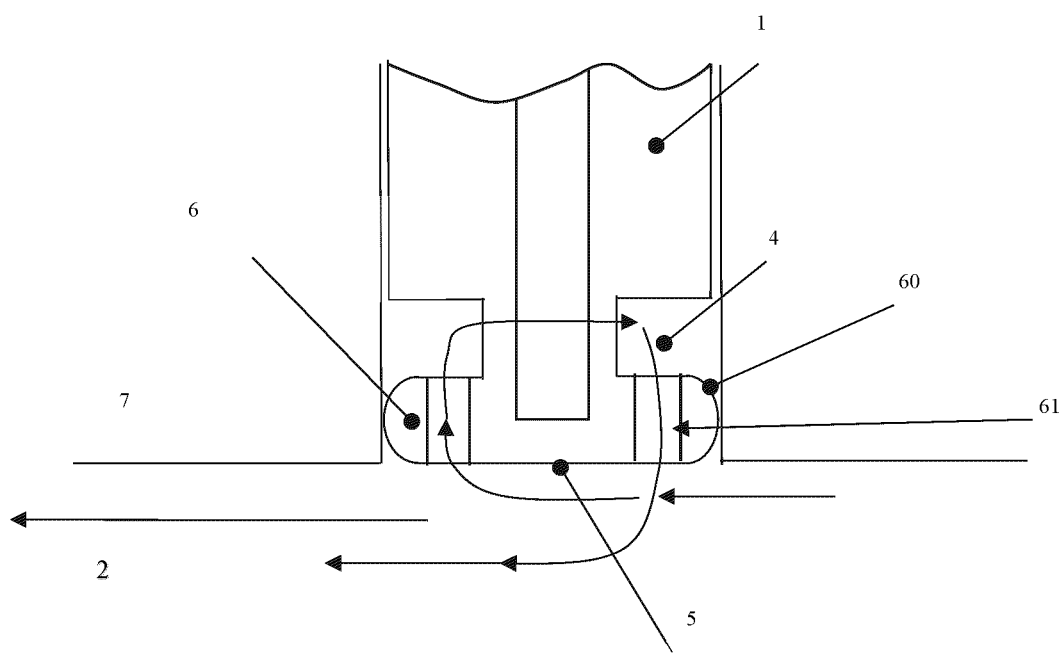
FIG. 3 represents a nonintrusive temperature assembly according to further embodiments of the disclosure.

With specific reference to FIG. 3, in one embodiment of the assembly of the disclosure, openings 61 might be made in the front-end disk 6, adjacent to the pipe wall 7 to allow the fluids to circulate in the cavity formed by the groove 4. Fluid might then enter the groove 4 on the downstream side of the disk 6 due to impingement on the thermowell body 1 and exits the groove 4 on the upstream side. The measurement location 30 is now surrounded with the fluid 2 to measure. The fluid velocity might promote heat transfer through convection. With such configuration, the measurement location 30 might be about fully surrounded by the fluid 2.

Figure 4:
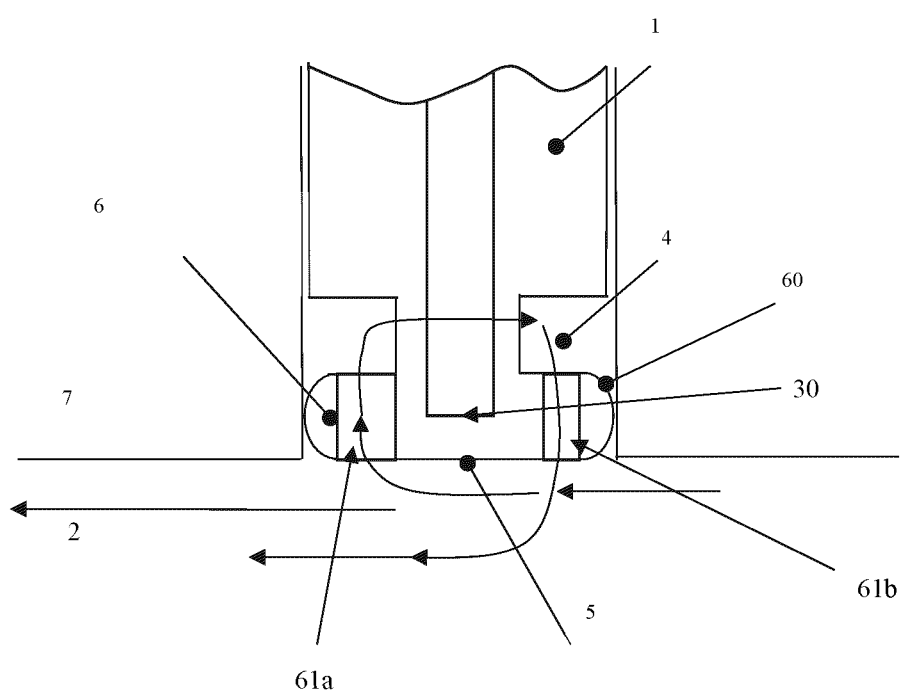
FIG. 4 represents a nonintrusive temperature assembly according to further embodiments of the disclosure.

With specific reference to FIG. 4, in an embodiment of the system of the disclosure, an opening 61a on the downstream side of the disk 6 might have a larger cross-sectional area than an opening 61b on the upstream side of the disk 6. This feature enables to generate a differential pressure between the openings 61a and 61b, which might further enhance the circulation and renewal of the fluids at the back of the temperature measurement location 30.

In embodiments, the thermowell body 1 may be machined from a metallic bar or forge. Some coating may be added for heat transfer purposes or erosion purposes. In addition to the embodiments depicted herein, it should be noted that the groove 4 at the back of the front face 5, creating a thermal choke, may be of any geometric shape. For example, a transition region may be shaped other than in a cone fashion, the openings may be of substantially the same size or shaped upstream and downstream as previously discussed. Along these lines, a variety of different shapes may be used for the openings 61. Further, the disk 6 may have edges 60 that are not truncated or be positioned other than as depicted, including having a front end that is not tangential to the flow and/or being positioned in a manner that is not completely flush with the pipe inner wall (whether slightly protruding or recessed).

Figure 5:
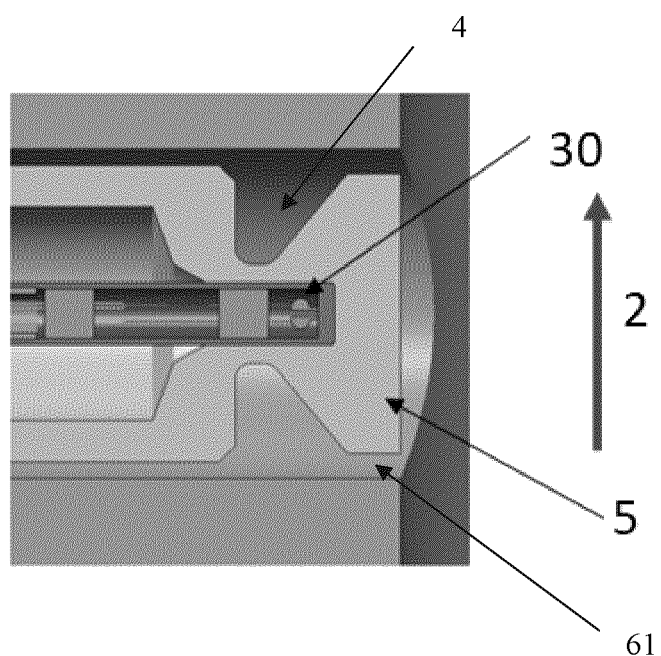
FIGS. 5 to 6 represent further schematic embodiments of a nonintrusive temperature assembly according to the disclosure.
Figure 6:
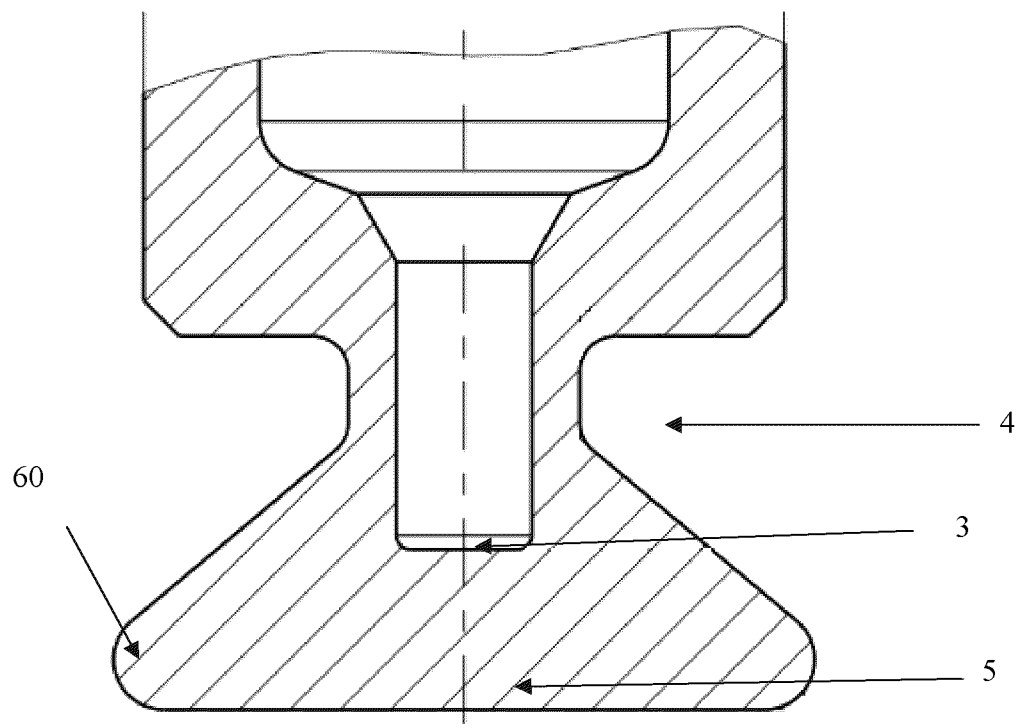

FIGS. 5-6 herein are provided as additional representations of embodiments for a substantially non-intrusive temperature assembly. FIG. 5 is a schematic representation of a nonintrusive temperature assembly of the disclosure. The front face 5 of the thermowell body 1 is substantially flush with an inner diameter of a pipe wherein fluid 2 flows. The groove 4 at the back of the front face 5 creates a thermal choke. In the represented embodiment, opening 61 are lodged between the thermowell body 1 and the pipe wall 7 so the fluid can flow through the openings 61 in the groove 4 and towards the sensor location 30 of measurement of temperature. FIG. 6 shows an embodiment of the thermowell body in greater detail.

The temperature sensor assembly of the disclosure may be implemented on multiphase sensing tools or anywhere in permanent or temporary subsea or topside processes where one needs to know the process temperature accurately while avoiding protruding into the flow (e.g. whether due to space limitations, risk of erosion, pressure losses, debris in the flow, etc.). For example, Christmas trees, injection lines and manifolds may benefit, among others, from this type of non-intrusive design.

The assembly of the disclosure may also provide (more) accurate temperature measurements of the flowing process fluid, relative to other non-intrusive measuring devices. This will in return improve the accuracy of other measurements or prediction and therefore improve or reduce overall operating expenses.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. For example, the assemblies and techniques detailed herein may be utilized outside of the oilfield, such as in chemical plants and processes. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A temperature sensor assembly for measuring temperature of a hydrocarbon fluid flowing in a conduit, the assembly comprising:
   a temperature sensor; and
   a thermowell body housing the temperature sensor and configured to be embedded in a wall defining the conduit, the thermowell body comprising a front-end disk having a front face for interfacing with the fluid, the front face being configured to be flush with the wall defining the conduit and a groove disposed behind the front-end disk, the groove extending radially inward of the front face and defining a cavity in which the fluid is able to circulate, wherein the groove is configured to minimize the cross-sectional area of the thermowell body proximate a location of the temperature sensor.

2. The assembly of claim 1 wherein the front face includes at least two openings to circulate fluid from the conduit toward the cavity defined by the groove.

3. The assembly of claim 2 wherein a first opening of the at least two openings is upstream of a second opening of the at least two openings.

4. The assembly of claim 3 wherein the second opening is larger than the first opening to promote a differential pressure for the circulation of the fluid.

5. The assembly of claim 1 wherein the front-end disk comprises at least one side configured to be in physical contact with the wall, the side of the front-end disk being rounded to minimize heat transfer therebetween.

* * * * *